(12) United States Patent
Gomez Cordon et al.

(10) Patent No.: US 12,162,998 B2
(45) Date of Patent: Dec. 10, 2024

(54) PROCEDURE TO PRODUCE GRAPHENE AND GRAPHENIC MATERIALS

(71) Applicant: Avanzare innovación tecnológica SL., La Rioja (ES)

(72) Inventors: Julio Gomez Cordon, La Rioja (ES); Javier Perez Martinez, La Rioja (ES); Luis Otaño Jimenez, La Rioja (ES)

(73) Assignee: AVANZARE INNOVACIÓN TECNOLÓGICA SL., la Rioja (ES)

( * ) Notice: Subject to any disclaimer, the term of this patent is extended or adjusted under 35 U.S.C. 154(b) by 277 days.

(21) Appl. No.: 17/189,580

(22) Filed: Mar. 2, 2021

(65) Prior Publication Data

US 2021/0277193 A1   Sep. 9, 2021

(30) Foreign Application Priority Data

Mar. 3, 2020 (EP) .................................. 20382155

(51) Int. Cl.
*C08J 3/20* (2006.01)
*C08K 3/04* (2006.01)

(52) U.S. Cl.
CPC .............. *C08J 3/203* (2013.01); *C08K 3/042* (2017.05); *C08J 2307/00* (2013.01); *C08J 2309/06* (2013.01); *C08J 2323/06* (2013.01); *C08J 2323/08* (2013.01); *C08J 2323/14* (2013.01); *C08J 2323/20* (2013.01);
(Continued)

(58) Field of Classification Search
CPC .... C08J 3/203; C08J 2307/00; C08J 2309/06; C08J 2323/06; C08J 2323/08; C08J 2323/14; C08J 2323/20; C08J 2331/04; C08J 2333/12; C08J 2367/02; C08J 2375/04; C08J 2377/12; C08J 2329/04; C08K 3/042; C08K 2201/001;
(Continued)

(56) References Cited

U.S. PATENT DOCUMENTS 7,354,988 B2   4/2008   Charati et al.
7,824,651 B2   11/2010  Zhamu et al.
(Continued)

FOREIGN PATENT DOCUMENTS

EP   2733116 A1   5/2014
GB   2532323 A    5/2016
(Continued)

OTHER PUBLICATIONS

Wei et al. "In situ exfoliation of graphite in solid phase for fabrication of graphene/polyamide-6 composites" Composites Science and Technology 153 (2017) 151-159 (Year: 2017).*
(Continued)

*Primary Examiner* — Andrew J. Oyer
(74) *Attorney, Agent, or Firm* — CANTOR COLBURN LLP (57) ABSTRACT

A process for the preparation of graphene, graphene materials, graphene oxide or reduced graphene oxide and the preparation of graphene, graphene materials, graphene oxide or reduced graphene oxide integrated in a thermoplastic and/or elastomeric polymer or polymer mixture by the effect of friction is produced by kneading, e.g., in an internal mixer with closed chamber or open chamber system, that performs the exfoliation of graphite, graphite oxide or reduced graphite oxide.

12 Claims, 2 Drawing Sheets

(52) U.S. Cl.
CPC ........ *C08J 2331/04* (2013.01); *C08J 2333/12* (2013.01); *C08J 2367/02* (2013.01); *C08J 2375/04* (2013.01); *C08J 2377/12* (2013.01); *C08K 2201/001* (2013.01); *C08K 2201/002* (2013.01)

(58) Field of Classification Search
CPC ............ C08K 2201/002; C01B 32/198; C01B 32/21; C01B 32/19
See application file for complete search history.

(56) References Cited

U.S. PATENT DOCUMENTS

| | | | |
|---|---|---|---|
| 8,771,630 B2 | 7/2014 | Wu et al. | |
| 2004/0131533 A1* | 7/2004 | Spacie | H01M 8/0254 264/293 |
| 2010/0036023 A1 | 2/2010 | Weng et al. | |

FOREIGN PATENT DOCUMENTS

| | | |
|---|---|---|
| WO | 2005014477 A1 | 2/2005 |
| WO | 2012028724 A1 | 3/2012 |
| WO | 2013010211 A1 | 1/2013 |
| WO | 2014062226 A1 | 4/2014 |
| WO | 2014140324 A1 | 9/2014 |
| WO | 2015145172 A1 | 10/2015 |
| WO | 2018036431 A1 | 3/2018 |

OTHER PUBLICATIONS

Wakabayashi et al. Polymer-Graphite Nanocomposites: Effective Dispersion and Major Property Enhancement via Solid-State Shear Pulverization, Macromolecules, 2008, 41, 6, 1905-1908 (Year: 2008).*
K. Wakabayashi et al. Polymer 51 (2010) 5525-5531 (Year: 2010).*
"Graphite", IUPAC Compendium of Chemical Terminology 2014, 1 page, doi: 10.1351/goldbook.G02684.
Demir et al., "A predictive model towards understanding the effect of reinforcement agglomeration on the stiffness of nanocomposites", Journal of Composite Materials 2022, vol. 56(10) 1591-1604.
Eckmann et al., "Probing the Nature of Defects in Graphene by Raman Spectroscopy" Nano Lett. 2012, 12, 3925-3930.
Jung et al., "A Rigorous Method of Calculating Exfoliation Energies from First Principles", Nano Lett. 2018, 18, 2759-2765.
Liu et al., Recycling and reuse of waste artificial turf via solid-stateshear milling technology, RSC Adv., 2017, 7, 54117-54127.
Lu et al., "Mechanochemical Recycling and Processing of Waste Crosslinked Polymers: Waste Tire Rubber and Waste XLPE From Cable Scraps", The 5th ISFR (Oct. 11-14, 2009, Chengdu, China), pp. 148-155.
Punera, "The effect of agglomeration and slightly weakened CNT-matrix interface on free vibration response of cylindrical nanocomposites", Acta Mech 232, 2455-2477 (2021).
Wang et al., "Pan-Milling Preparation of Polypropylene-graft-Maleic Anhydride and Its Compatibilizing Effect on Polyamide 6/Polypropylene Blend", Polymer Journal, vol. 33, No. 7, pp. 522-527 (2001).
Xia et al., "Preparation of Polypropylene/Carbon Nanotube Composite Powder with a Solid-State Mechanochemical Pulverization Process", Journal of Applied Polymer Science, vol. 93, 378-386 (2004).
Xu et al., "Pan Mill Type Equipment Designed for Polymer Stress Reactions: Theoretical Analysis of Structure and Milling Process of Equipment", Plastic, Rubber and Composites Processing and Applications, 25(3), 152-158, 1996.
Yang et al., "Recycling of automotive shredder residue by solid state shear milling technology", Journal of Industrial and Engineering Chemistry 57 (2018) 143-153.
Zare, "Study of nanoparticles aggregation/agglomeration in polymer particulate nanocomposites by mechanical properties", Composites: Part A 84 (2016) 158-164.
Wakabayashi et al, "Polypropylene-graphite nanocomposites made by solid-state shear pulverization: Effects of significantly exfoliated, unmodified graphite content on physical, mechanical and electrical properties" Polymer 51 (2010) 5525-5531.
Paton et al., "Scalable production of large quantities of defect-free few-layer graphene by shear exfoliation in liquids" Nature Materials, 2014, vol. 13, pp. 624-630.
Scidà et al, "Application of graphene-based flexible atennas in consumer electronic devices" Materials Today, 2018, vol. 21, No. 3, pp. 223-230, doi.org/10,1016/j.mattod.2018.01.007.
Wick et al, "Classification Framework for Graphene-Based Materials" Angew Chem. Int. Ed., 2014, vol. 53, pp. 7714-7718.

* cited by examiner

PROCEDURE TO PRODUCE GRAPHENE AND GRAPHENIC MATERIALS

CROSS REFERENCE TO RELATED APPLICATIONS

This application is related to and claims the benefit of European Patent Application No. 20382155.8, filed on Mar. 3, 2020, the contents of which are incorporated herein by reference in their entirety.

TECHNICAL FIELD

The present disclosure relates to a process for the preparation of graphene, graphene materials, graphene oxide or reduced graphene oxide and the preparation of graphene, graphene materials, graphene oxide or reduced graphene oxide integrated in a thermoplastic or elastomer by the effect of friction produced by kneading, e.g., in an internal mixer with closed chamber or open chamber system that performs the exfoliation of graphite, graphite oxide or reduced graphite oxide.

BACKGROUND

Graphene, graphene materials, graphene oxide and reduced graphene oxide are materials that have interesting mechanical, electrical and thermal conductivity properties, barrier effect and chemical protection. Significant enhancements in various physicochemical properties can be obtained to thermoplastic, thermoset and elastomeric polymers by reinforcement with different graphene materials.

The use of graphene, graphene related materials, graphene oxide or reduced graphene oxide in polymeric matrices, thermoplastic, thermoset or elastomeric, has a strong interest. However, at present, the manufacture of graphene, graphene materials, graphene oxide or reduced graphene oxide and the mix with different polymer matrices is not resolved under scalable conditions, at low cost and in conditions sufficiently safe for workers and the environment.

Different methods have been proposed to obtain graphene or graphene materials from graphite by physical or mechanical treatment:

Methods based on the milling of graphene materials precursors by technologies known in the state of the art and whose effect is based on the realization of shocks against the material, as shown in WO2005014477A1 or EP2733116A1. Methods based on liquid phase exfoliation by the application of ultrasonication on the precursor material in different liquid media with or without the presence of additives of different functions such as WO2013010211A1, WO2012028724A1 or U.S. Pat. No. 7,824,651. Methods based on precursor exfoliation by hydrodynamic effect in liquids provided by mechanical mixers or homogenizers have also been used as in WO2014140324A1 and GB2532323A There are other methods of treating precursors such as graphite or graphite previously treated by different effects WO2015145172A1.

It is also known in the state of the art the addition of graphene or graphene materials previously exfoliated to elastomers by mixing methods also known in the state of the art as internal mixers, for example Banbury. In these cases, the use of these methods is intended to add graphene or graphene material already exfoliated and prepared previously, to the thermoplastic polymer or elastomer as in US20100036023, WO2018036431 or in U.S. Pat. No. 7,354,988.

Also, in the state of the art, the preparation of graphene or graphene materials in molten thermoplastic matrices has been raised by continuously extruding the material to which graphite WO2014062226 has been added. In these cases, the thermoplastic polymer is processed at temperatures above the melting point thereof, which is in liquid form.

SUMMARY

The object of the present disclosure is the preparation of graphene, graphene materials, graphene oxide or reduced graphene oxide by exfoliating graphite, graphite oxide or reduced graphite oxide in a matrix formed by a thermoplastic polymer or elastomer at a temperature lower than its melting point in order to obtain new properties and functionalities to the mixtures compared to the net polymer. Graphene, graphene materials, graphene oxide or reduced graphene oxide, integrated in a thermoplastic or elastomeric matrix, polymer, can also be used as a vehicle for the addition of graphene, graphene materials, graphene oxide or reduced graphene oxide to other thermoplastic, thermostable or elastomeric polymers other than those used for the exfoliation.

The objects of the disclosure are further specifically defined in the claims and further elucidated here below.

DETAILED DESCRIPTION OF THE DRAWINGS

The present disclosure relates to the preparation of graphene, graphene oxide or reduced graphene oxide integrated with one of more layers maned as graphene materials by the scientific and technical literature in a thermoplastic polymer or elastomer. The preparation method is based on the in-situ exfoliation of graphite, graphite oxide or reduced graphite oxide at temperatures lower than the melting temperature of the polymer by kneading some of these starting materials in a thermoplastic polymer or elastomer.

Graphene materials are a family of sheet materials, or two-dimensional, low thickness, between 1 and 10 layers, as described in the editorial article of Professor Bianco (CARBON 65, 2013, 1-6) Six working principles are established and provides the necessary nomenclature to systematically define the different graphene materials:

Graphene sheet or monolayer graphene (monolayer): one single layer of 1 atom of thickness with hexagonal arrangement where the carbon atoms have sp2 bonds.

Graphene microplate: adapts to the previous definition, and its use is recommended for cases in which the lateral size is in the range between 100 nm and 100 μm.

Bilayer/three-layer graphene: two-dimensional materials composed of 2 or 3 layers of graphene.

Multilayer graphene (multilayer): material composed of between 2 and approximately 10 layers of graphene. Some authors limits to 30 the maximum of layers for multilayer graphene.

Graphene of few layers (few layers): material composed of between 2 and 5 layers of graphene.

Graphite nanoparticles or nanoplatelets: materials with graphite arrangement that have a dimension smaller than 100 nm (can be the thickness or lateral size).

Exfoliated graphite: Material obtained by a partial exfoliation of graphite or graphite intercalation materials (thermal, mechanical or chemical), with a 3D structure (thickness greater than 10 layers).

Graphite is an allotropic form of the element carbon, comprising graphene layers stacked parallel to each other in a three-dimensional, crystalline, long-range order. The number of layers of graphene is higher than 10. For example, a graphite particle with 50 micros of thickness has composed of approximately 150.000 layers of graphene and a graphite particle of 1 mm of thickness is composed by 3.000.000 of layers of graphene.

Graphene oxide (GO): chemically modified graphene by massive oxidation of the plane; being a single layer material with a high oxygen content. The C/O atomic ratio can be close to 2 (or up to 3).

Multilayer graphene oxide: this name is proposed for the materials compose of a maximum of 10 layers of graphene oxide.

Graphite oxide: material in which the sheets have been modified and functionalized, increasing the space between the layers. This material has more than 10 layers, and can be partially delaminated to obtain graphene oxide of few layers or fully exfoliated until it reaches graphene oxide. Graphene and graphite oxides are characterized by presenting a diffraction peak of X-ray diffraction different from the rest, (001) compared to (002) of the reduced or pristine ones.

Reduced graphene oxide (rGO): it is the material obtained after applying reduction processes, they can be thermal, chemical, photochemical treatments, by microwaves or microorganisms.

Functionalized graphene materials. For this type of decorations or functionalizations it is proposed to include the type of molecule that functionalizes it. For example: reduced graphene oxide microplatelet functionalized with aminopropylsilane.

Thus, for example, a reduced graphene oxide with an average number of layers of 7 will be called multilayer reduced graphene oxide and if the average number of layers is between 2 and 5 it will be called a few layers of reduced graphene oxide.

Graphene materials can also be classified as indicated in the "Classification Framework for Graphene-Based Materials". Angew Chem. Int. Ed. 2014, 53, 7714-7718, In this case a model is proposed for such classification according to three characteristics of the material: Number of layers, Average lateral size, Atomic ratio C/O.

Graphene materials have a very high aspect ratio, because their thickness is very low, being between 0.35 nm for a graphene monolayer or a reduced graphene oxide monolayer, up to a maximum thickness of 10 nm that could present a multilayer of graphene oxide. The aspect ratio is calculated by dividing the average lateral size by the average thickness. The lateral size is usually small for materials produced by liquid phase exfoliation, such as those developed by Professor Coleman (Nature Materials 2014, 13, 624-630); However, it can be very high, for example, in the AVA18 graphene material published in "Application of graphene-based flexible antennas in consumer electronic devices" Materials Today, 2018, doi.org/10.1016/j.mattod.2018.01.007.

The lateral size is the size in the graphene plane and it is one of the key factors of the graphene materials. A larger lateral size will produce a better interaction with the matrix. The lateral size measurement of the graphene material, can be performed by various techniques, both in powder and in a processed sample, for example, in solution. However, this sample processing can alter the lateral size preventing a correct characterization of it. For these reasons the use of laser diffraction of solid samples is an appropriate tool for their characterization. These types of measures are expressed in percentiles, the D50 percentile being the most common, which refers to the value of the particle size for which 50% of the distribution is of a smaller size.

This disclosure is based on a process for the preparation of graphene, graphene materials, graphene oxide or reduced graphene oxide and thermoplastic polymers or elastomers that contain graphene, graphene materials, graphene oxide or reduced graphene oxide and that is based on the in-situ exfoliation of graphite, graphite oxide or reduced graphite oxide by kneading of these precursors in a polymer or mixture of thermoplastic polymers or elastomers when the polymer, or the mixture of polymers, is at a temperature below its melting point.

Kneading of the polymer or polymers in a non-molten state with the graphite, graphite oxide or reduced graphite oxide may be preferably carried out by an internal mixer and more preferably by a Banbury type mixer. Internal mixers produce forces and effects of friction and do not produce impact forces or shocks. When the forces that are applied to graphite, graphite oxide or reduced graphite oxide are shock or impact forces, the sheets of these precursor materials are broken, reducing their lateral size. When the shock action is very intense, the precursor materials instead of exfoliating into graphene, graphene materials, graphene oxide or reduced graphene oxide, it produces the reduction of the lateral size of the material and even become amorphous and transform into amorphous carbon and lose their properties. Surprisingly when the forces that are applied to graphite, graphite oxide or reduced graphite oxide are friction or shear and the graphite, graphite oxide or reduced graphite oxide is surrounded by polymer, the sheets of these precursors are separated, exfoliated and they do not fracture, maintaining the lateral size which gives rise to graphene, graphene materials, graphene oxide or reduced graphene oxide and in addition graphene, graphene materials, graphene oxide or reduced graphene oxide formed are integrated in the polymer.

Internal mixers include chambers in which the material is deformed by rotating blades or rotors present inside the chamber. In most cases they have a chamber in which two rotors are inserted that describe concentric paths with said chamber.

Internal mixers are classified according to their rotors in tangential or intermeshing type. When the rotor is tangential the kneading of the polymer and graphite assembly, graphite oxide or reduced graphite oxide, is mainly caused by the contact of the mass assembly between the rotor and the housing. When the internal mixer is of the intermeshing type the kneading of the polymer and graphite assembly, graphite oxide or reduced graphite oxide is mainly produced by the contact of the mass between the two gears. In both cases the exfoliation of graphite, graphite oxide or reduced graphite oxide is produced by the friction and shear produced by the not melt polymer with graphite, graphite oxide or reduced graphite oxide.

The Banbury mixer is an internal tangential type mixer, in which two spiral-shaped rotors rotate inside a chamber. The chamber is of the closed type, although it has a top opening through which the products to be kneaded are added and which is closed by pneumatic or hydraulic system during the kneading process. When the material has been added, the piston down and produce pressure on the introduced products. The mixer moves the polymer and graphite, graphite oxide or reduced graphite oxide mixture and it is this kneading that is transformed into friction and shear between the polymer and the precursor and finally causes the latter to exfoliate.

The intermeshing type mixers have a structure similar to the Banbury mixer in that they have a closed chamber and also work under pressure, but differ from the Banbury mixer in that the movement of the polymer and graphite, graphite oxide or reduced graphite oxide occurs between the two rotors. Exfoliation of graphite, graphite oxide or reduced graphite oxide is produced by the effects of friction and shear between the precursor and the polymer.

Internal mixers can also work using a close chamber however it works without use pressure. The rotors can have different geometries, being known in the state of the art the mixers with blades in the form of sigma among others. In these cases, the final effect is again the friction and shear between the polymer and the graphite, graphite oxide or reduced graphite oxide.

Another option of achieving the effect of friction and shear by kneading the polymer or polymer blend in a non-molten state with the graphite, graphite oxide or reduced graphite oxide is preferably performed by an open mixer and more preferably by a roller mixer or calender.

There are other different designs of mixers known in the state of the art with tangential, intermeshing, or other types of rotors. Also, the shape of the rotors can be variable, for example, in spiral, sigma, or others and the equipment also introduces different variants in the shape of the mixing chamber and its closing system, and even in open systems. This disclosure may use any system capable of producing friction and shear between the mixture of a thermoplastic polymer or elastomer in the non-molten state and graphite, graphite oxide or reduced graphite oxide and excludes the systems that produce shock between the polymer or other solid materials with graphite, graphite oxide or reduced graphite oxide or even shock of the graphite itself, graphite oxide or reduced graphite oxide with itself.

To carry out this disclosure the amount of graphite, graphite oxide or reduced graphite oxide added to the polymer or polymer mixture may be from 0.1 to 90%, preferably from 1 to 80% and more preferably from 2 to 60% wt, based on the total weight of polymer or polymer mixture and the graphite, graphite oxide or reduced graphite oxide. The graphite, graphite oxide or reduced graphite oxide employed in the present disclosure have an average number of graphene sheets or layers, graphene oxide or reduced graphene oxide comprised between 2 layers and 6 million layers and more preferably between 6 layers and 60.000 layers and still more preferably between 10 layers and 3.000 layers. At lower number of layers, the in situ exfoliation process is more effective and needs lower time.

Generally, the total kneading time of the material for perform the effects of this disclosure is longer than the kneading time that would only be necessary to achieve the mixing of graphite, graphite oxide or reduced graphite oxide with the polymer. When the polymer and graphite, graphite oxide or reduced graphite oxide are kneaded in the aforementioned mixers, the dispersion of the precursor particles occurs in the first instance until a time when their distribution becomes homogeneous. This process is a typical mixing process known in the state of the art. In the present disclosure, the kneading time is always greater than the mixing time, even that necessary to obtain homogeneous distribution of the precursor particles, since what surprisingly happens when increasing the process time is the exfoliation of the sheets that constitute the graphite, graphite oxide or reduced graphite oxide. To achieve the exfoliation of graphite, graphite oxide or reduced graphite oxide, the kneading time can be from 1 minute to 4 hours, preferably between 2 minutes and 2 hours and more preferably between 5 minutes and 1 hour. The exfoliation time depends on both the polymer and the thickness of graphite, graphite oxide or reduced graphite oxide.

In order to produce the effect of exfoliation of graphite, graphite oxide or reduced graphite oxide to produce graphene, graphene oxide or reduced graphene oxide, it is necessary that the thermoplastic and/or elastomeric polymer (mixture) be below its melting point. The different thermoplastics or elastomers and mixtures referred to in this disclosure may also have different melting points. When the thermoplastic or elastomeric polymer is below its melting point it is capable of transmitting enough energy by friction and shear to graphite, graphite oxide or reduced graphite oxide to exfoliate its bidimensional layers. If the kneading process is performed when the thermoplastic polymer or elastomer is in the molten state, friction and shear decrease and the effect of exfoliation of the precursors present in the polymer (mixture) no longer occurs.

For the realization of this disclosure the polymer or mixture of thermoplastic polymers or elastomers can be used in form of pellets, pre-cut strips, powder, sheets, among others.

For the realization of this disclosure the polymer or mixture of thermoplastic polymers or elastomers is below its melting temperature during kneading with the graphite, graphite oxide or graphite oxide reduced and the kneading temperature should be 15 to 160° C., preferably 25 to 140° C. and more preferably 60 to 120° C. depending on the polymer or polymer mixture in which the kneading is performed.

The polymer or polymer mixture in which the disclosure can be carried out are thermoplastic and/or elastomeric polymers and their mixtures and although not limited, may be selected from the following:

Linear low density polyethylene, branched low density polyethylene, low density polyethylene, polyolefin copolymers such as poly (ethylene-co-propylene), poly (ethylene-co-butene), poly (ethylene-co-hexene), poly (ethylene-co-4-methyl-1-pentene), poly (ethylene-co-octene), poly (propylene-co-butene), poly (propylene-co-hexene), poly (propylene-co-4-methyl-1-pentene), poly (propylene-co-octene), poly (butylene-co-hexene), poly (butylene-co-4-methyl-1-pentene), poly (butylene-co-octene), ethylene rubber-propylene (EPR), chlorinated polyethylene, chlorosulfonated polyethylene, plasticized polyvinyl chloride (PVC), poly (ethylene-co-vinyl acetate), polyvinyl acetate and its copolymers, poly (ethylene-co-methylacrylate), poly (ethylene-co-ethylacrylate), poly (ethylene-co-butylacrylate), poly (ethylene-co-methylmethacrylate), poly (ethylene-co-ethylmethacrylate), poly (ethylene-co-butyl methacrylate), natural rubber (NR), polyisoprene, styrene-butadiene rubber (SBR), acrylonitrile butadiene rubber (NBR), acrylonit rubber hydrogenated rilo-butadiene (HNBR), carboxylated acrylonitrile-butadiene rubber (XNBR), ethylene-propylene-diene rubber (EPDM) being the diene preferably norbornadiene, dicyclopentadiene, 1,4-hexadiene, piperylene or 5-ethylidene-2-norbornene mixtures thereof, chloroprene rubber, polybutadiene, polybutylene, polystyrene butadiene styrene (SBS), ethylene polystyrene butadiene styrene (SEBS), block copolymer elastomers comprising two or more hard segments of a polyester or a polyamide and two or more soft segments of polyester or polyether such as PEBAX, Hytrel and others, silicone elastomers, thermoplastic elastomeric polyurethanes, thermoplastic elastomeric polyureas, acrylic rubbers (ACM), fluorinated rubbers (FKM), epichlorohydrin rubbers (ECO), polysulfide rubbers such as Thiokol and mixtures thereof. Melting temperature will depend on the type and grade of polymer, for example a typical melting for HDPE is 132° C., for LDPE 110° C., EVA with 18% of vynilacetate 88° C. and a mixture LLDPE80% wt-EPDM20% wt 129° C.

The thermoplastic or elastomer polymer (mixture)s used in this disclosure have a Mooney viscosity greater than 10, measured at 120° C. In the case of rubbers such as natural rubber, styrene butadiene rubber or nitrile rubber, the most frequent working Mooney viscosity may be from 30 to even 80.

The exfoliation control can be performed using several techniques in which it can be observed directly in the polymer such as RAMAN spectroscopy, X-ray diffraction and even electron microscopy techniques such as SEM and TEM, or also by dissolving the polymer in the appropriate solvents.

Figure 1:
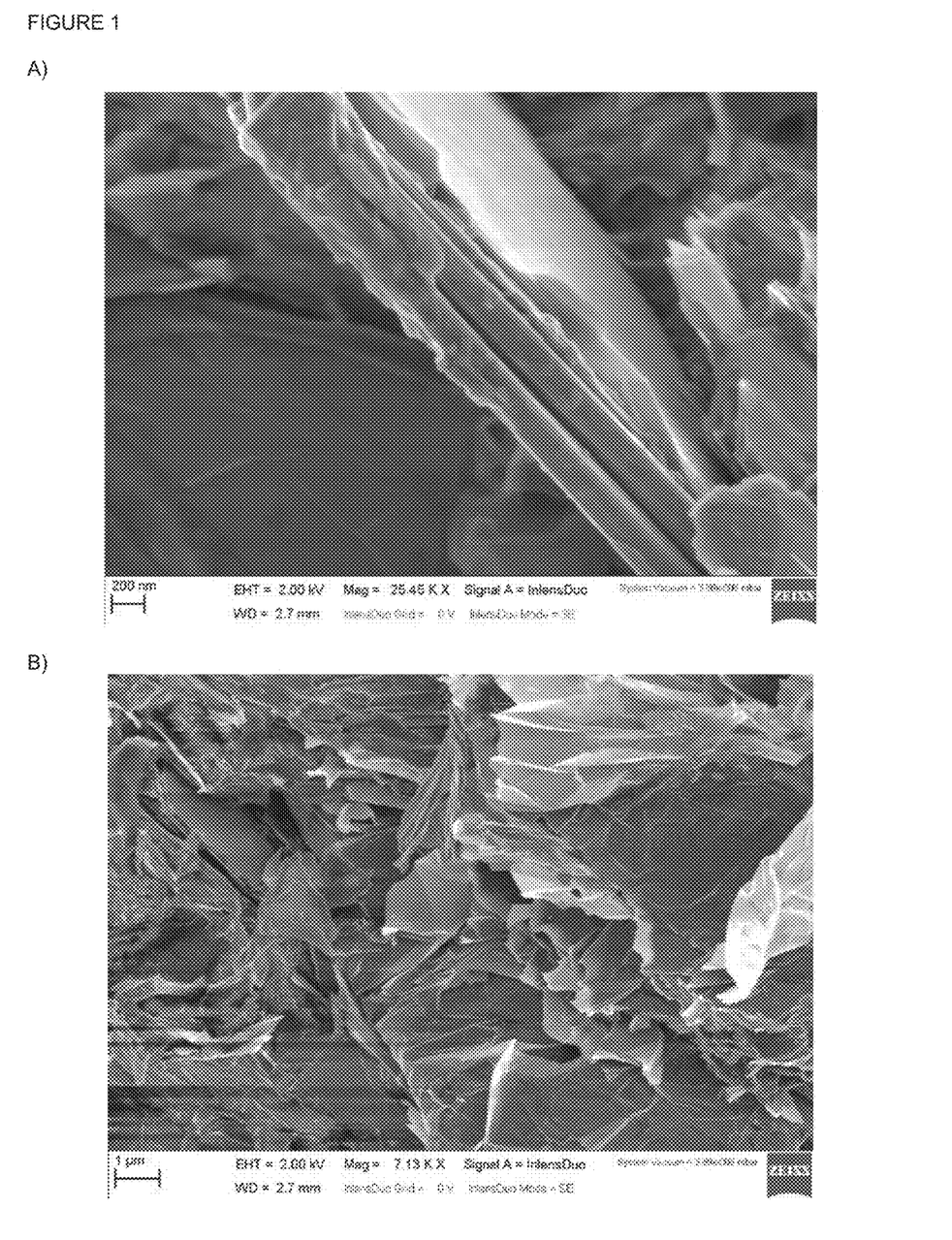
FIG. 1: A: FE-SEM of Example 1 to 1-minute; B: FE-SEM after 20 minutes.
Figure 2:
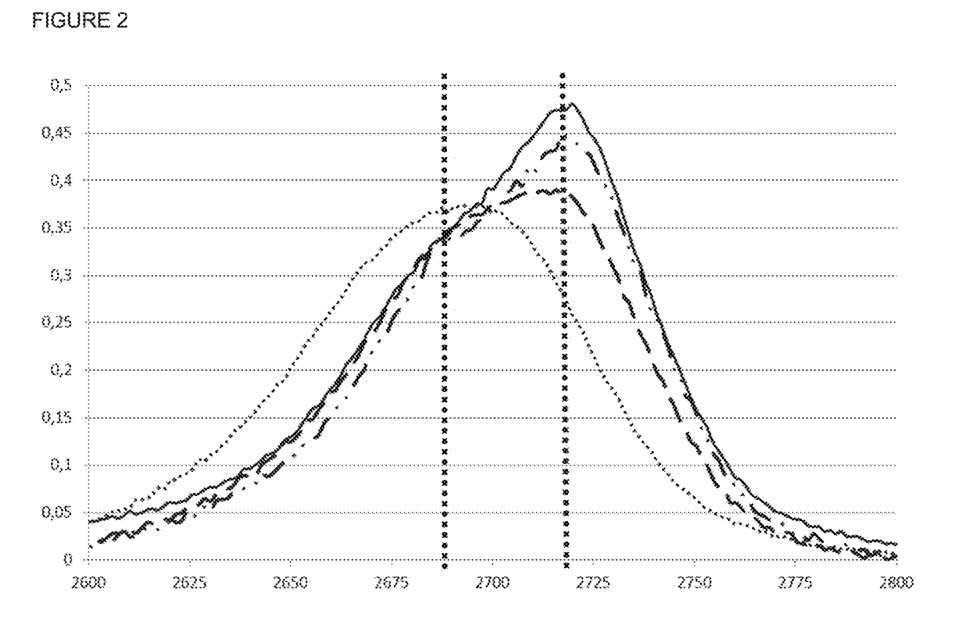
FIG. 2: RAMAN spectrum cantered on the 2D band for av-PLAT40, for Example 2.2.

Scanning electron microscopy, in which a decrease in the thickness of graphene materials is observed, FIG. 1. In this figure it is observed that without processing or with a short time processing, processing (e.g. 1 minute, FIG. 1 A), the average thickness of the starting graphite is greater than 100 nm, which means more than 300 layers of graphene. However, through long processing times (e.g. 20 minutes, FIG. 1 B), and due to the friction and shear forces that occur during kneading, graphene sheets are exfoliated RAMAN spectroscopy is one of the most powerful techniques for determining exfoliation in graphene materials. This technique allows the exfoliation to be determined by moving the 2D band at shorter wavelengths and also the band becomes more symmetrical, as Professor Coleman has proposed (Nature Materials 2014, 13, 624-630). FIG. 1 shows the 2D band offset of the av-PLAT40 material (Graphite Nanoplatelets) for Example 2.2 Applying the Coleman formulas (Nature Materials 2014, 13, 624-630), the number of graphene layers It is reduced from 80 layers for the starting material, gradually reducing depending on the processing time, 74 layers in 4 minutes, 60 in 8 minutes, 34 in 25 minutes up to 8.7 in the material that has been 60 minutes.

Figure 3:
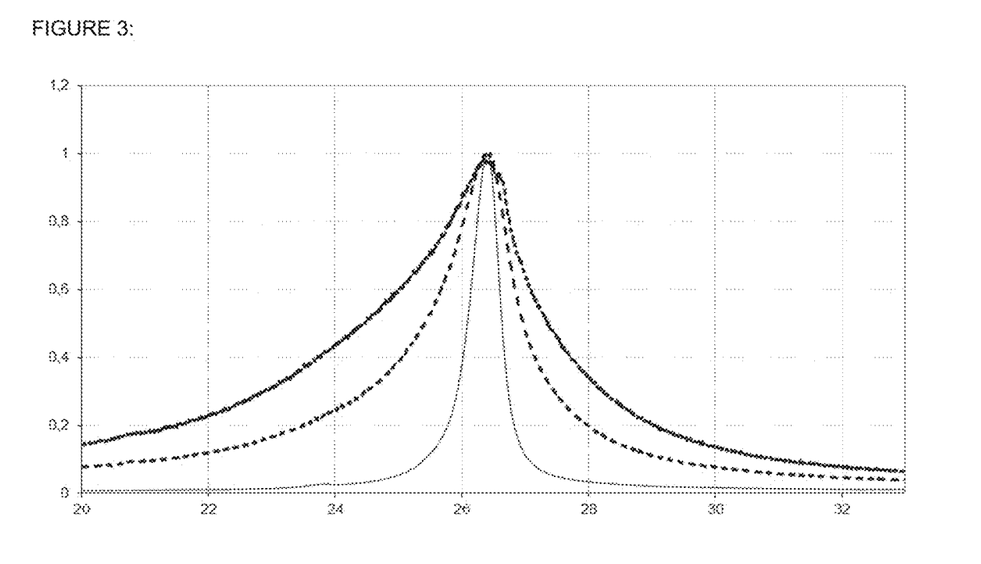
FIG. 3: X-ray diffractogram of av-PLAT70 (solid line) and of example 3.3 at 20 min ( - - - ) and at 40 min ( . . . ).

And also, by powder X-ray diffraction, observing an increase in the average width of the diffraction peak (002), associated with a smaller thickness of the sheets of the graphitic or graphenic material. There is also a decrease in peak intensity (002). As a mode of example FIG. 3 shows an X-ray diffractogram of av-PLAT70 (solid line) and of example 3.3 at 20 min ( - - - ) and at 40 min ( . . . ).

The exfoliation of graphite, graphite oxide or reduced graphite oxide in the polymer can be carried out in the presence of different components which may be necessary to add to the polymer (mixture) to assist the kneading processes or which may be necessary in its subsequent uses. These additives, although not limited, can be plasticizers such as: esters, organic phosphates, alkanes also known as paraffinic oils, naphthenic oils, aromatic oils, ethers, alcohols and polyalcohols, glycols, polyglycols, silicones, oligomers compatible with the polymers to be kneaded, and any other plasticizer additive and mixtures thereof.

In addition, the set of graphite, graphite oxide or reduced graphite oxide and thermoplastic and/or elastomeric polymer (mixture) may contain other additives such as, among others: Antioxidants, ultraviolet protectors, release agents, thermal stabilizers, vulcanizing agents, peroxides, internal lubricants, external lubricants, process aids, silanes and coupling agents, dispersants, surfactants, and any other additives which may further assist to achieve a desired behaviour during the process and which may be necessary to obtain the final properties required for the polymer that encapsulates graphene, graphene materials, graphene oxide or reduced graphene oxide.

Graphene, graphene materials, graphene oxide or reduced graphene oxide exfoliated in the thermoplastic and/or elastomeric polymer (mixture) by the above procedure can be recovered by separating it from the polymer (mixture), by state-of-the-art methods in dry or solvent processes, allowing to prepare of graphene, graphene materials, graphene oxide or reduced graphene oxide separated from the polymer by dry or liquid procedures and used in other polymer (mixture)s or applications. Liquid procedures for separation are methods based on washing with water or a solvent or mixing of solvent and separation by filtration, centrifugation, evaporation among other. Also, the liquid dispersion of the graphene, graphene oxide, reduced graphene oxide, graphene material can be direct use. Another liquid method is based in the dissolution of the polymer in an organic solvent and the separation of the graphene based materials by filtration or centrifugation. Other liquid method can be based in the dissolution of the polymer and the coagulation or precipitation of the polymer and the separation of the polymer. A dry method can be a selective thermal decomposition of the polymer.

Graphene, graphene oxide, reduced graphene oxide, graphene material obtained with this procedure has no the lack of the presence of surfactants, solvents and other chemical compounds associated compared with the produced by liquid phase exfoliation, ultrasonication, and other chemical processes or by thermochemical exfoliation.

Accordingly, the present disclosure relates to a graphene, graphene oxide, or reduced graphene oxide of one or more layers obtainable by a process as described herein.

Graphene, graphene materials, graphene oxide or reduced graphene oxide exfoliated in the thermoplastic and/or elastomeric polymer (mixture) by the above procedure can be also used without separation from the polymer (mixture). In this case, there is an optimal integration and dispersion of graphene, graphene oxide, reduced graphene oxide or graphene materials in the polymer or polymer mixtures due to the kneading process. This will drastically reduce the number of aggregates and agglomerates of graphene, graphene oxide, reduced graphene oxide or graphene materials in the polymer (mixture).

Graphene, graphene materials, graphene oxides or reduced graphene oxide exfoliated in the thermoplastic or elastomeric polymer can be processed to obtain bulk composite, plates, sheets, threads, dust or pellets by applying any system known in the state of the art whose function is to transform the mass of polymer that already contains graphene, graphene oxide or reduced graphene oxide into elements that can be used in subsequent processes of transport, packaging, mixing with other materials, deposition or dispersion in different media by procedures known in the state of the art. Graphene, graphene materials, graphene oxide or reduced graphene oxides obtained by exfoliation in situ, integrated in the polymer in which said exfoliation occurs and processed to obtain forms that facilitate subsequent processes, can be used directly or can be used as a vehicle to add graphene, graphene materials, graphene oxide or reduced graphene oxide thereto or to different thermoplastic, elastomeric or thermosetting polymers. Graphene, graphene materials, graphene oxide or reduced graphene oxides exfoliated in the thermoplastic or elastomeric polymer are added to the same polymer or to different thermoplastic, elastomeric or thermosetting polymers, by dosing in extrusion processes, injection, internal mixing, turbomixing, or stirring with solution, so that the resulting final polymers contain graphene, graphene materials, graphene oxide or reduced graphene oxide. The processes of adding a polymer to other polymers are well known in the current state of the art.

Accordingly, the present disclosure also relates to a polymeric material comprising graphene, graphene oxide, reduced graphene oxide or one or more layers obtainable by a process as described herein.

Due to the intrinsic properties of graphene, graphene materials, graphene oxide or reduced graphene oxide, the use of thermoplastic polymers or elastomers containing graphene, graphene materials, graphene oxide or reduced graphene oxide, prepared by in situ exfoliation at a temperature lower than its melting point as described in this disclosure, allows to add graphene, graphene materials, graphene oxide or reduced graphene oxide easily to any polymer. The addition of graphene, graphene materials, graphene oxide or reduced graphene oxide serves to confer new mechanical properties, such as, mechanical reinforcement, wear resistance, impact resistance, electrical conductivity, thermal conductivity, improvement of thermal stability, improvement of the barrier to the passage of gases and liquids, and fire resistance properties to the thermoplastic, thermostable or elastomeric polymers.

Accordingly, one aspect of the present disclosure relates to a method for conferring electrical conductivity, thermal conductivity, improved thermal stability, mechanical reinforcement, wear resistance, impact resistance, improvement of the barrier to the passage of gases or liquids, and fire resistance properties to a polymeric material, comprising preparing the polymeric material by a process as described herein.

Similarly, the present disclosure also relates to the use of a polymeric material or a graphene, graphene oxide or reduced graphene oxide of one or more obtained by methods as described herein for providing a polymeric material having electrical conductivity, thermal conductivity, improved thermal stability, mechanical reinforcement, wear resistance, impact resistance, improvement of the barrier to the passage of gases or liquids, and fire resistance properties.

EXAMPLES

To characterize the exfoliation of the graphite precursor achieved by kneading the mixture of precursor and polymer in which the graphene or graphene material manufactured will be integrated, the X-ray diffraction method and RAMAN spectroscopy are applied, and listed as $N_G$: medium number of graphene layers.

Example 1

They have been made by kneading TIMREX 20×50 natural graphite at different percentages by weight and times in poly (ethylene-co-vinyl acetate) EVA 28% or natural rubber (NR) contained in vinyl acetate maintaining a maximum temperature of 100° C. in a Banbury type internal mixer.

| No | PRE-CURSOR | POLYMER | % PRE-CURSOR IN THE POLYMER | PROCESSING TIME (min) | $N_G$ |
|---|---|---|---|---|---|
| 1.1 | TIMREX 20×50 | NR | 0, 1 | 1 | >100 |
| 1.2 | TIMREX 20×50 | poly (ethylene-co-vinyl acetate) EVA 28% VA | 10 | 5 | 84 |
| 1.3 | TIMREX 20×50 | poly (ethylene-co-vinyl acetate) EVA 28% VA | 50 | 5 | >100 |
| 1.4 | TIMREX 20×50 | poly (ethylene-co-vinyl acetate) EVA 28% VA | 50 | 40 | 32 |
| 1.5 | TIMREX 20×50 | poly (ethylene-co-vinyl acetate) EVA 28% VA | 90 | 40 | >100 |

Example 2

They have been made by kneading graphite/graphene nanoplatelets avPLAT40 from AVANZARE (material that has also been used in thermoset composites, Vijay K. Srivastava, Thomas Gries, Dieter Veit, Till Quadflieg, Benjamin Mohr, Martin Kolloch, Effect of nanomaterial on mode I and mode II interlaminar fracture toughness of woven carbon fabric reinforced polymer composites, Engineering Fracture Mechanics, 2017, 180, 73-86, https://doi.org/10.1016/j.engfracmech.2017.05.030) a different percentages by weight and times in poly (ethylene-co-vinyl acetate) EVA 28% or natural rubber (NR) contained in vinyl acetate maintaining a maximum temperature of 100° C. in a Banbury type internal mixer.

| No | PRE-CURSOR | POLYMER | % PRE-CURSOR IN THE POLYMER | PROCESSING TIME (min) | $N_G$ |
|---|---|---|---|---|---|
| 2.1 | PLAT40 | NR | 0, 1 | 1 | 80 |
| 2.2 | PLAT40 | poly (ethylene-co-vinyl acetate) EVA 28% VA | 10 | 60 | 8,7 |
| 2.3 | PLAT40 | poly (ethylene-co-vinyl acetate) EVA 28% VA | 50 | 5 | 78 |
| 2.4 | PLAT40 | poly (ethylene-co-vinyl acetate) EVA 28% VA | 50 | 40 | 56 |
| 2.5 | PLAT40 | poly (ethylene-co-vinyl acetate) EVA 28% VA | 90 | 40 | 80 |

Example 3

In the following example, they have been made by kneading graphite/graphene nanoplatelets (PLAT 70) in LDPE low density polyethylene maintaining a maximum temperature of 60° C. during the process in a Banbury type internal mixer.

| No | PRE-CURSOR | POLYMER | % PRE-CURSOR IN THE POLYMER | PROCESSING TIME (min) | $N_G$ |
|---|---|---|---|---|---|
| 3.1 | PLAT 70 | LDPE | 0, 1 | 10 | 18 |
| 3.2 | PLAT 70 | LDPE | 1 | 20 | 8 |
| 3.3 | PLAT 70 | LDPE | 5 | 40 | 3 |

-continued

| No | PRE-CURSOR | POLYMER | % PRE-CURSOR IN THE POLYMER | PROCESSING TIME (min) | $N_G$ |
|---|---|---|---|---|---|
| 3.4 | PLAT 70 | LDPE | 10 | 60 | 15 |
| 3.5 | PLAT 70 | LDPE | 20 | 90 | 17 |

Example 4

In the following example they have been made by kneading graphite/graphene nanoplatelets (PLAT 70) in LDPE low density polyethylene maintaining a maximum temperature of 160° C. during the process in a Banbury type internal mixer.

| No | PRE-CURSOR | POLYMER | % PRE-CURSOR IN THE POLYMER | PROCESSING TIME (min) | $N_G$ |
|---|---|---|---|---|---|
| 4.1 | PLAT 70 | LDPE | 1 | 20 | 20 |
| 4.2 | PLAT 70 | LDPE | 5 | 20 | 20 |
| 4.3 | PLAT 70 | LDPE | 20 | 20 | 20 |

Example 5

The following examples have been made by kneading graphite (TIMREX 20×50) in styrene butadiene rubber (SBR) while maintaining a maximum temperature of 120° C. during the process in a Banbury type internal mixer.

| No | PRE-CURSOR | POLYMER | % PRE-CURSOR IN THE POLYMER | PROCESSING TIME (min) | $N_G$ |
|---|---|---|---|---|---|
| 5.1 | TIMREX 20×50 | SBR | 1 | 5 | >100 |
| 5.2 | TIMREX 20×50 | SBR | 10 | 15 | 64 |
| 5.3 | TIMREX 20×50 | SBR | 50 | 30 | >100 |

Example 6

The following examples have been made by kneading graphite (TIMREX 20×50) in poly (propylene-co-butene) while maintaining a maximum temperature of 60° C. during the process in an internal Banbury mixer.

| No | PRE-CURSOR | POLYMER | % PRE-CURSOR IN THE POLYMER | PROCESSING TIME (min) | $N_G$ |
|---|---|---|---|---|---|
| 6.1 | TIMREX 20×50 | poly (propylene-co-butene) | 1 | 40 | 10 |
| 6.2 | TIMREX 20×50 | poly (propylene-co-butene) | 10 | 40 | 48 |
| 6.3 | TIMREX 20×50 | poly (propylene-co-butene) | 50 | 40 | >100 |

Example 7

The following examples have been made by kneading graphite/graphene nanoplatelets av-PLAT40 in different polymers at a maximum temperature of 60° C. during the process in a Banbury type internal mixer.

| No | PRE-CURSOR | POLYMER | % PRE-CURSOR IN THE POLYMER | PROCESSING TIME (min) | $N_G$ |
|---|---|---|---|---|---|
| 7.1 | avPLAT40 | Polyester polyamide | 10 | 30 | 26 |
| 7.2 | avPLAT40 | Polyester polyamide | 10 | 60 | 9.2 |
| 7.3 | avPLAT40 | ECO | 10 | 60 | 8.3 |
| 7.4 | avPLAT40 | TPU | 10 | 60 | 6.2 |
| 7.5 | avPLAT40 | EVA 28% plasticized with dioctyl adipate DOA 10% | 10 | 60 | 7.9 |
| 7.6 | avPLAT40 | EVA 28% plasticized with triethylene glycol dibenzoate 10% | 10 | 60 | 9.6 |
| 7.7 | avPLAT40 | poly (ethylene-co-methyl methacrylate) | 10 | 60 | 28 |
| 7.8 | avPLAT40 | PVC 50% Dioctyl terephthalate 50% | 10 | 60 | 5, 6 |
| 7.9 | avPLAT40 | SBS | 10 | 60 | 7 |

Example 8

The following examples have been made by kneading avPLAT40 in low density polyethylene maintaining a maximum temperature of 80° C. during the process in an internal mixer of the type rotary screws.

| No | PRE-CURSOR | POLYMER | % PRE-CURSOR IN THE POLYMER | PROCESSING TIME (min) | $N_G$ |
|---|---|---|---|---|---|
| 8.1 | avPLAT40 | LDPE | 1 | 20 | 8.5 |
| 8.2 | avPLAT40 | LDPE | 10 | 20 | 38 |
| 8.3 | avPLAT40 | LDPE | 50 | 60 | 80 |

Example 9

The following examples have been made by kneading avPLAT40 in EPDM rubber while maintaining a maximum temperature of 50° C. during the process in an open mixer with two calender rollers.

| No | PRE-CURSOR | POLYMER | % PRE-CURSOR IN THE POLYMER | PROCESSING TIME (min) | $N_G$ |
|---|---|---|---|---|---|
| 9.1 | avPLAT40 | EPDM | 1 | 120 | 7.9 |
| 9.2 | avPLAT40 | EPDM | 10 | 120 | 80 |
| 9.3 | avPLAT40 | EPDM | 50 | 120 | 80 |

Example 10

To characterize the exfoliation of the graphite oxide precursor achieved by kneading the mixture of graphite oxide and polymer precursor into which the manufactured graphene oxide will be integrated, the X-ray diffraction method is applied.

The following examples have been made by kneading graphite oxide (characteristics) in acrylic rubber maintaining a maximum temperature of 70° C. during the process in a closed Banbury mixer.

| No | PRE-CURSOR | POLYMER | % PRE-CURSOR IN THE POLYMER | PRO-CESSING TIME (min) | $N_G$ |
|---|---|---|---|---|---|
| 10.1 | Graphite Oxide | Acrylic rubber | 1 | 1 | 8 |
| 10.2 | Graphite Oxide | Acrylic rubber | 1 | 10 | 3 |
| 10.3 | Graphite Oxide | Acrylic rubber | 10 | 60 | 12 |

Example 11

To characterize the exfoliation of the reduced graphite oxide precursor achieved by kneading the mixture of precursor and polymer in which the manufactured graphene material will be integrated, the X-ray diffraction method is applied.

The following examples have been made by kneading reduced graphite oxide in acrylic rubber or in polyvinyl acetate while maintaining a maximum temperature of 70° C. during the process in a closed Banbury mixer.

| No | PRE-CURSOR | POLYMER | % PRE-CURSOR IN THE POLYMER | PRO-CESSING TIME (min) | $N_G$ |
|---|---|---|---|---|---|
| 11.1 | Reduced graphite oxide | Acrylic rubber | 1 | 10 | 3, 4 |
| 11.2 | Reduced graphite oxide | Acrylic rubber | 5 | 10 | 9 |
| 11.3 | Reduced graphite oxide | Acrylic rubber | 10 | 10 | 15 |
| 11.4 | Reduced graphite oxide | Polyvinyl-acetate | 10 | 10 | 5 |
| 11.5 | Reduced graphite oxide | Polyvinyl-acetate | 40 | 10 | 15 |

Example 12

The graphene material integrated in the poly (propylene-co-butene) polymer according to the previous example 6.1 is shaped as a pellet by means of a pelletizer and is used as a vector of graphene material in the homopolymer Polypropylene polymer. 0.25 kg of pellets containing the graphene material integrated is added to 0.75 kg of polypropylene. It is mixed and extruded in a twin-screw extruder at a temperature of 220° C. The thread obtained is cut in a knife cutter. The material is injected in the form of 2 mm thick plates. The volumetric electrical resistance value obtained is 783 KOhm/sq.

Example 13

The graphene material integrated in the poly (ethylene-co-vinyl acetate) EVA polymer of 28% vinyl acetate content according to the previous example No. 2.2 is shaped as a pelletizer and used as a vector of graphene material in the same polymer. 0.5 kg of 28% poly (ethylene-co-vinyl acetate) EVA pellet containing integrated graphene material is added to 0.50 Kg of 28% poly (ethylene-co-vinyl acetate) EVA content vinyl acetate It is mixed and extruded in a twin-screw extruder at 175° C. The thread obtained is cut in a cutter blades the material is injected in the form of 2 mm thick plates. The volumetric electrical resistance value obtained is 17 KOhm/sq.

Example 14

The graphene material integrated in the polyvinylacetate polymer according to the previous example No. 11.4 is sprayed by a knife mill and used as a vector of graphene material in unsaturated polyester resin with styrene content of 50%. 0.10 kg of polyvinylacetate powder containing the graphene material is added to 0.90 kg of unsaturated polyester resin. It is mixed by a paddle shaker at 100 rpm for 8 minutes. To the mixture obtained is added 0.5% accelerator with a cobalt salt and 2% methyl isobutyl ketone peroxide and stirred by the same paddle stirrer at 100 rpm for 2 minutes. The obtained liquid mixture is deposited on a silicone mold and polymerized at 120° C. for 30 min. The volumetric electrical resistance value obtained in the polymerized thermosetting resin plate is 458 KOhm/sq.

The invention claimed is:

1. A process for the preparation of graphene, graphene oxide, or reduced graphene oxide of 1 to 30 layers or for the preparation of a polymeric materials containing graphene, graphene oxide or reduced graphene oxide of 1 to 30 layers, the process comprising an in-situ exfoliation of graphite, graphite oxide or reduced graphite oxide by kneading in a non-molten state in an internal mixer said graphite, graphite oxide or reduced graphite oxide in a polymer or a polymer mixture, wherein the polymer is a thermoplastic and/or elastomeric polymer in form of pellets, pre-cut strips, powder or sheets, wherein kneading is performed at temperature below the melting point of the polymer or the polymer mixture, thereby providing a thermoplastic and/or elastomeric polymer or polymer mixture comprising graphene, graphene oxide or reduced graphene oxide of 1 to 30 layers.

2. The process according to claim 1, wherein kneading is performed by an open mixer.

3. The process according to claim 1, wherein the graphene, graphene oxide, or reduced graphene oxide has from 1 to 10 layers.

4. The process according to claim 1, wherein the amount of graphite, graphite oxide or reduced graphite oxide added to the polymer or polymer mixture is in the range of 0.1 and 90% wt based on the total weight of polymer or polymer mixture and the graphite, graphite oxide or reduced graphite oxide.

5. The process according to claim 1, wherein the kneading time is comprised between 1 minute and 4 hours.

6. The process according to claim 1, wherein the kneading temperature is from 15 to 160° C.

7. The process according to claim 1, wherein the graphite, graphite oxide or reduced graphite oxide have an average number of layers between 2 and 6 million.

8. The process according to claim 1, wherein the thermoplastic and/or elastomeric polymer is selected from Linear low density polyethylene; branched low density polyethylene; low density polyethylene; polyolefin copolymers selected from poly (ethylene-co-propylene), poly (ethylene-co-butene), poly (ethylene-co-hexene), poly (ethylene-co-4-methyl-1-pentene), poly (ethylene-co-octene), poly (propylene-co-butene), poly (propylene-co-hexene), poly (propylene-co-4-methyl-1-pentene), poly (propylene-cooctene), poly (butylene-co-hexene), poly (butylene-co-4-methyl-1-pentene), poly (butylene-co-octene), ethylene-propylene rubber (EPR), chlorinated polyethylene, chlorosulfonated polyethylene, plasticized polyvinyl chloride (PVC), poly (ethylene-co-vinyl acetate), polyvinyl acetate and its copolymers, poly (ethylene-co-methylacrylate), poly (ethylene-co-ethylacrylate), poly (ethylene-co-butylacrylate), poly (ethylene-co-methylmethacrylate), poly (ethylene-co-ethylmethacrylate) and poly (ethylene-co-butyl methacrylate); natural rubber (NR), polyisoprene, styrene-butadiene rubber (SBR), acrylonitrile butadiene rubber (NBR), hydrogenated nitrile butadiene rubber (HNBR), carboxylated acrylonitrile-butadiene rubber (XNBR), ethylene-propylene-diene rubber (EPDM), wherein the diene is norbornadiene, dicyclopentadiene, 1,4-hexadiene, piperylene or 5-ethylidene-2-norbornene or mixtures thereof; chloroprene rubber; polybutadiene; polybutylene; polystyrene butadiene styrene (SBS); ethylene polystyrene butadiene styrene (SEBS); block copolymer elastomers, comprising two or more hard segments of a polyester or a polyamide and two or more soft segments of polyester or polyether, selected from PEBAX and Hytrel; silicone elastomers; thermoplastic elastomeric polyurethanes; thermoplastic elastomeric polyureas; acrylic rubbers (ACM); fluorinated rubbers (FKM); epichlorohydrin rubbers (ECO); polysulfide rubber Thiokol or mixtures thereof.

9. The process according to claim 1, wherein kneading is performed in the presence of plasticizers, said plasticizers being selected from: esters, organic phosphates, alkanes also known as paraffinic oils, naphthenic oils, aromatic oils, ethers, alcohols and polyalcohols, glycols, polyglycols, silicones, oligomers compatible with the polymers to be kneaded and any other plasticizer additive or mixtures thereof.

10. The process according to claim 1, wherein the graphene, graphene oxide or reduced graphene oxide of one or more layers is separated from the polymer or polymer mixture by liquid procedures.

11. The process according to claim 1, wherein
the thermoplastic and/or elastomeric polymer or polymer mixture comprising graphene, graphene oxide or reduced graphene oxide of one or more layers, or
the separated graphene, graphene oxide or reduced graphene oxide of one or more layers is added to
a thermoplastic and/or elastomeric polymer or polymer mixture, which may be the same as or different to the thermoplastic and/or elastomeric polymer or polymer mixture used for in-situ exfoliation of graphite, graphite oxide or reduced graphite oxide; or
to a thermoset polymer or polymer mixture.

12. The process according to claim 1, wherein the thermoplastic and/or elastomeric polymer or polymer mixture comprising graphene, graphene oxide or reduced graphene oxide of one or more layers or the polymeric material is further processed to obtain polymeric bulk composites, plates, sheets, threads, dust or pellets.

* * * * *